US012343888B2

(12) United States Patent
Takano et al.

(10) Patent No.: US 12,343,888 B2
(45) Date of Patent: Jul. 1, 2025

(54) ATTACHMENT FOR ELECTRIC HAIR-CUTTING DEVICE

(71) Applicant: Panasonic Intellectual Property Management Co., Ltd., Osaka (JP)

(72) Inventors: Daisuke Takano, Shiga (JP); Hitoshi Ogawa, Shiga (JP); Satoshi Sobagaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 17/791,121

(22) PCT Filed: Sep. 17, 2020

(86) PCT No.: PCT/JP2020/035250

§ 371 (c)(1),
(2) Date: Jul. 6, 2022

(87) PCT Pub. No.: WO2021/161571

PCT Pub. Date: Aug. 19, 2021

(65) Prior Publication Data

US 2023/0034347 A1 Feb. 2, 2023

(30) Foreign Application Priority Data

Feb. 14, 2020 (JP) ................................. 2020-023726

(51) Int. Cl.
*B26B 19/20* (2006.01)
*B26B 19/06* (2006.01)
(Continued)

(52) U.S. Cl.
CPC .............. *B26B 19/06* (2013.01); *B26B 19/20* (2013.01); *B26B 19/3813* (2013.01); *B26B 19/42* (2013.01)

(58) Field of Classification Search
CPC ...................................................... B26B 19/20
See application file for complete search history.

(56) References Cited

U.S. PATENT DOCUMENTS 3,421,213 A * 1/1969 Pawlikowski ........ B26B 21/125 30/30
D429,378 S 8/2000 Wu
(Continued)

FOREIGN PATENT DOCUMENTS

CN 101489737 A 7/2009
CN 108356862 A 8/2018
(Continued)

OTHER PUBLICATIONS

English Translation of Chinese Search Report dated Jan. 30, 2024 for the related Chinese Patent Application No. 202080093749.9.
(Continued)

*Primary Examiner* — Evan H Macfarlane
(74) *Attorney, Agent, or Firm* — Rimon P.C.

(57) ABSTRACT

An attachment which is detachably attached to an electric hair-cutting device having a blade part, and is selectable between a first use mode in which the attachment is used with a first side of the blade part coming into contact with a skin and a second use mode in which the attachment is used with a second side of the blade part coming into contact with the skin. The attachment includes a comb part disposed around the blade part. The comb part includes at least one first comb having a first skin contact surface coming into contact with the skin when the first use mode is selected, a second skin contact surface coming into contact with the skin when the second use mode is selected, a first hair raising groove formed on the first skin contact surface, and a second hair raising groove formed on the second skin contact surface.

8 Claims, 11 Drawing Sheets

(51) Int. Cl.
*B26B 19/38* (2006.01)
*B26B 19/42* (2006.01)

(56) References Cited

U.S. PATENT DOCUMENTS

| | | | | |
|---|---|---|---|---|
| 2008/0168662 | A1* | 7/2008 | Mikula | B26B 19/20 30/233 |
| 2018/0207818 | A1 | 7/2018 | Wang et al. | |

FOREIGN PATENT DOCUMENTS

| | | | |
|---|---|---|---|
| EP | 2055449 | A1 | 5/2009 |
| EP | 3354423 | A1 | 8/2018 |
| JP | 2018-117911 | A | 8/2018 |

OTHER PUBLICATIONS

International Search Report issued on Dec. 15, 2020 in International Patent Application No. PCT/JP2020/035250, with English translation.
The EPC Office Action dated Jun. 14, 2023 for the related European Patent Application No. 20918374.8.

* cited by examiner

ATTACHMENT FOR ELECTRIC HAIR-CUTTING DEVICE

CROSS-REFERENCE OF RELATED APPLICATIONS

This application is the U.S. National Phase under 35 U.S.C. § 371 of International Patent Application No. PCT/JP2020/035250, filed on Sep. 17, 2020, which in turn claims the benefit of Japanese Patent Application No. 2020-023726, filed on Feb. 14, 2020, the entire disclosures of which Applications are incorporated by reference herein.

TECHNICAL FIELD

The present disclosure relates to an attachment for an electric hair-cutting device.

BACKGROUND ART

Conventionally, as disclosed in PTL 1, an attachment attachable to an electric hair-cutting device has been proposed.

In PTL 1, the attachment is attached to the electric hair-cutting device, and the attachment is disposed around a blade part of the electric hair-cutting device. Thus, hair can be safely cut without bringing a cutting edge into direct contact with a skin.

CITATION LIST

Patent Literature

PTL 1: Unexamined Japanese Patent Publication No. 2018-117911

SUMMARY OF THE INVENTION

When such an attachment is used, it is preferable to more reliably raise lying hair during cutting.

Thus, an object of the present disclosure is to provide an attachment for an electric hair-cutting device capable of raising lying hair more reliably.

An attachment for an electric hair-cutting device according to one aspect of the present disclosure is detachably attached to an electric hair-cutting device having a blade part and is selectable between a first use mode in which the attachment is used with a first side of the blade part coming into contact with a skin and a second use mode in which the attachment is used with a second side facing the first side of the blade part coming into contact with a skin. The attachment includes a comb part that is disposed around the blade part in a state of being attached to the electric hair-cutting device. The comb part includes at least one first comb that has a first skin contact surface coming into contact with the skin when the first use mode is selected, a second skin contact surface coming into contact with the skin when the second use mode is selected, a first hair raising groove formed on the first skin contact surface, and a second hair raising groove formed on the second skin contact surface.

According to the present disclosure, it is possible to obtain the attachment for the electric hair-cutting device capable of raising the lying hair more reliably.

DESCRIPTION OF EMBODIMENT

Figure 1:
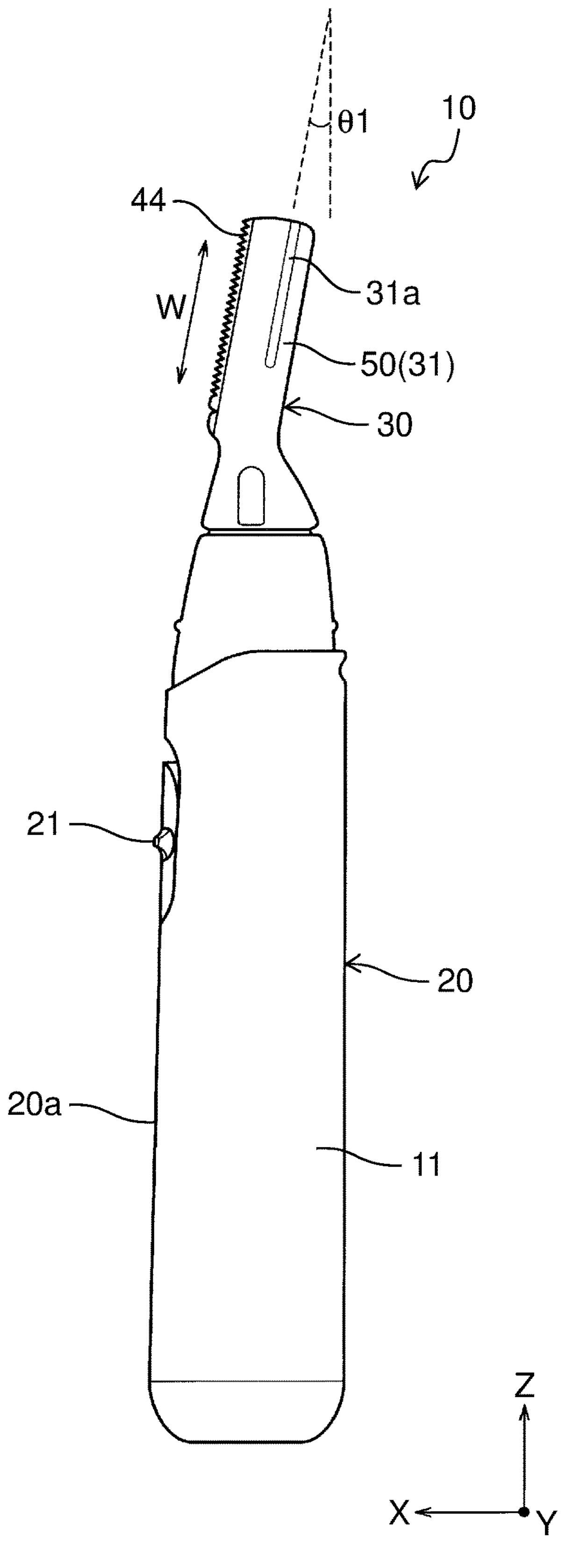
FIG. 1 is a side view illustrating an electric hair-cutting device according to an exemplary embodiment.

Hereinafter, an exemplary embodiment will be described in detail with reference to the drawings. However, unnecessarily detailed description is omitted in some cases. For example, a detailed description of already well-known matters or a redundant description of a substantially identical configuration may be omitted.

Note that the attached drawings and the following description are provided for those skilled in the art to fully understand the present disclosure, and are not intended to limit the subject matter as described in the appended claims.

Further, in the following exemplary embodiment, a trimmer that cuts an eyebrow that is hair from the skin or hair on a head of a human or an animal is exemplified as an electric hair-cutting device.

Here, in the present exemplary embodiment, a longitudinal direction of a grip part of the trimmer is defined as up-down direction Z, a width direction of the grip part of the trimmer is defined as width direction Y, and a direction orthogonal to up-down direction Z and width direction Y is defined as front-rear direction X.

Further, in the present exemplary embodiment, a side of the grip part where a head part is arranged is defined as an upper side in the up-down direction, and a side of the grip part where a switch part is provided is defined as a front side in the front-rear direction.

Moreover, in the present exemplary embodiment, a linear reciprocating direction of a movable blade (a reciprocating sliding direction of the movable blade) is defined as blade moving direction W.

Exemplary Embodiment

As illustrated in FIGS. 1 to 4, trimmer (electric hair-cutting device) 10 according to the present exemplary embodiment includes grip part 20 that can be gripped by a hand, and head part 30 which is provided with blade part 40 and supported by grip part 20. This trimmer 10 is, for example, a device that cuts eyebrow H of a user or the like to a desired length to treat to trim eyebrow H of the user or the like.

[Example of Configuration of Trimmer]

Next, an example of a configuration of trimmer 10 will be described.

In the present exemplary embodiment, trimmer 10 includes housing 11 made of synthetic resin, and housing 11 is formed by joining a plurality of divided bodies. A cavity is formed in housing 11 formed by joining the divided bodies, and this cavity accommodates various electric components. These plurality of divided bodies can be joined by using screws or by fitting the divided bodies together, for example.

In the present exemplary embodiment, the cavity formed inside of housing 11 accommodates an electric motor (not illustrated), a power supply unit (not illustrated) that drives an electric motor, and the like. Moreover, the cavity formed inside of housing 11 accommodates motion converter 60 that converts a rotational motion of the electric motor into a translational motion. As this motion converter 60, a conventionally known motion converter can be used. In the present exemplary embodiment, motion converter 60 is accommodated inside of housing 11. Motion converter 60 comprises arm part 61 connected to drive pole 43*a* of bush 43, which will be described later, and converts the rotational motion of the electric motor into a linear reciprocating motion of arm part 61.

Further, as described above, in the present exemplary embodiment, trimmer 10 includes grip part 20 and head part 30.

Grip part 20 has an elongated cylindrical shape in up-down direction Z, and is formed in a size that allows the user to grip with one hand.

Figure 2:
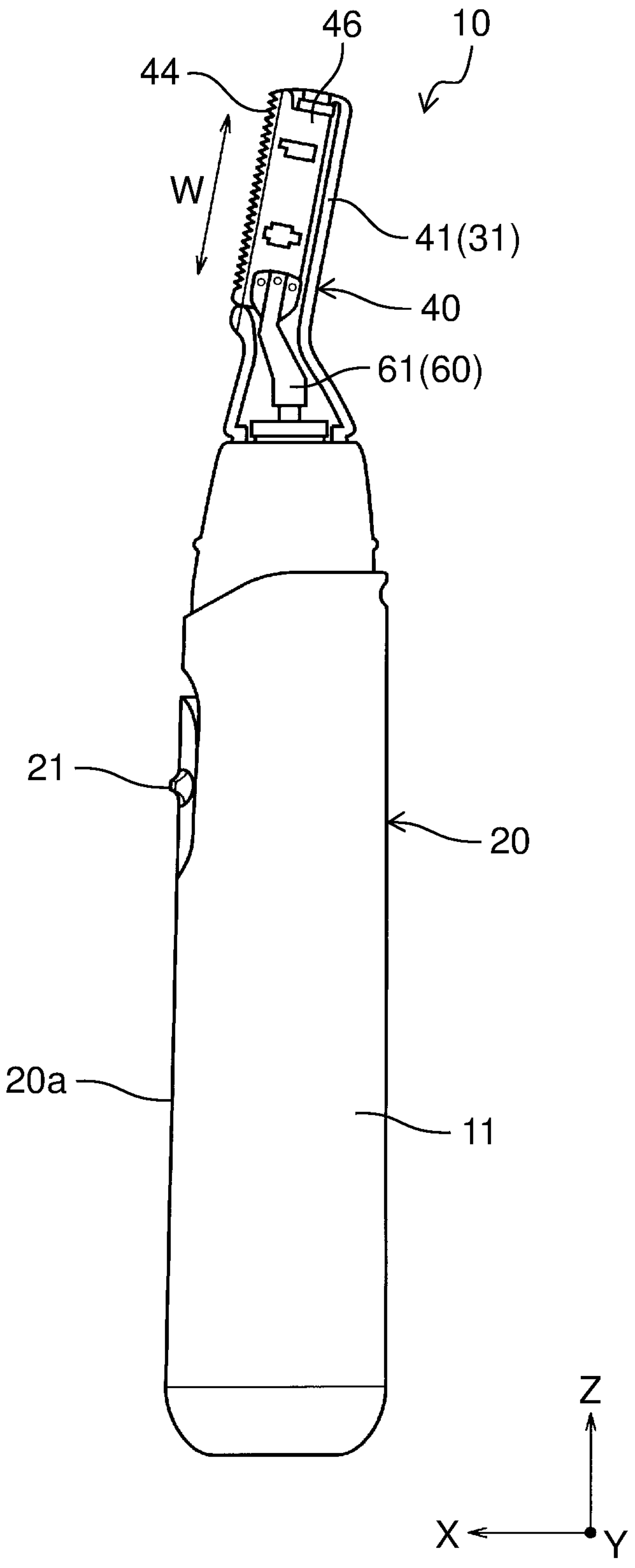
FIG. 2 is a side view illustrating a state where a cover of the electric hair-cutting device according to the exemplary embodiment has been removed.
Figure 5:
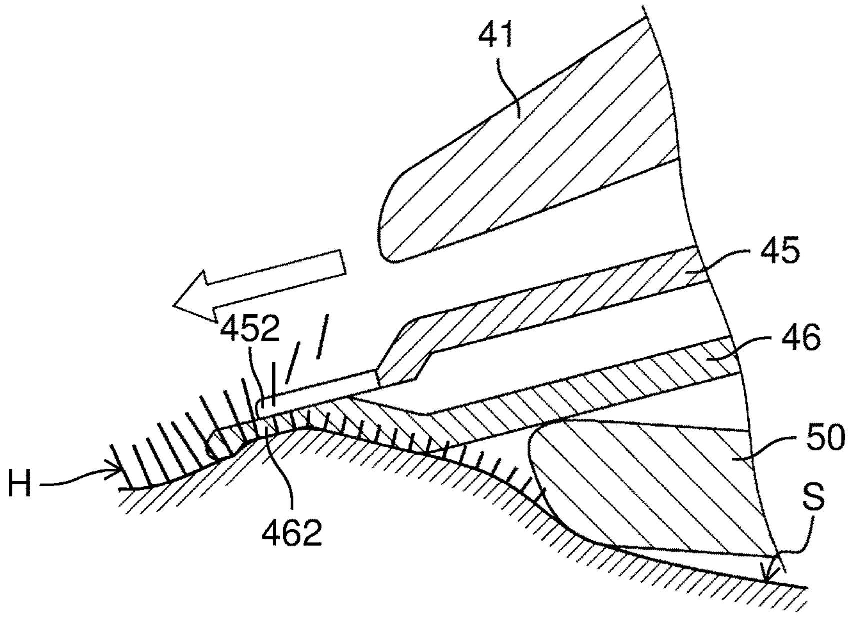
FIG. 5 is a cross-sectional view illustrating an example in which the electric hair-cutting device according to the exemplary embodiment is used with a fixed blade bar coming into contact with a skin.
Figure 6:
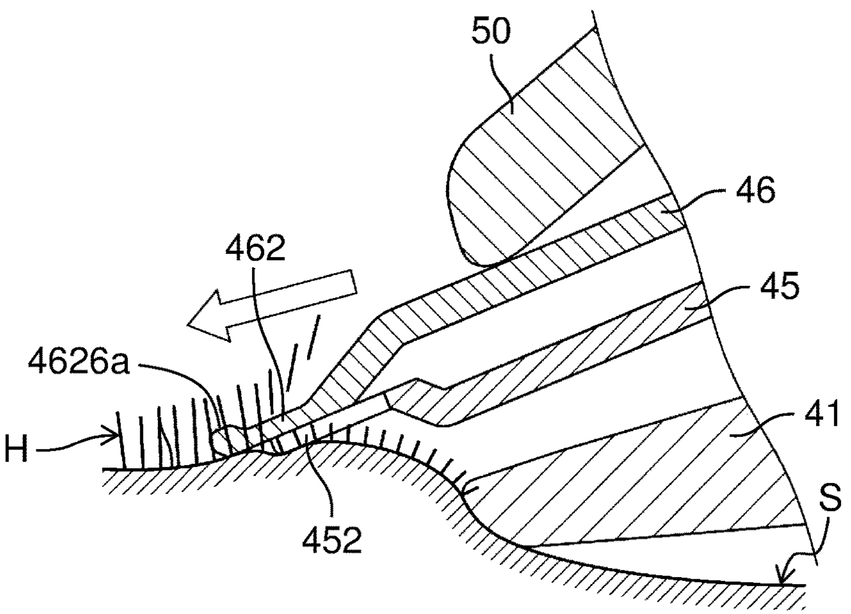
FIG. 6 is a cross-sectional view illustrating an example in which the electric hair-cutting device according to the exemplary embodiment is used with a movable blade bar coming into contact with a skin.

Head part 30 is integrally and continuously provided at the upper end of grip part 20 in up-down direction Z, and this head part 30 is provided with blade unit 40 having a function of cutting eyebrow (hair) H (see FIG. 2). In the present exemplary embodiment, as illustrated in FIGS. 5 and 6, blade unit 40 includes blade part (a blade of the electric hair-cutting device) 44 formed by arranging movable plate (movable blade) 45 and fixed plate (fixed blade) 46 to be opposed to each other. This blade part 44 is configured such that movable blade bar 452, which will be described later, of movable plate 45 reciprocatingly slides in blade moving direction W with respect to fixed blade bar 462, which will be described later, of fixed plate 46.

Figure 3:
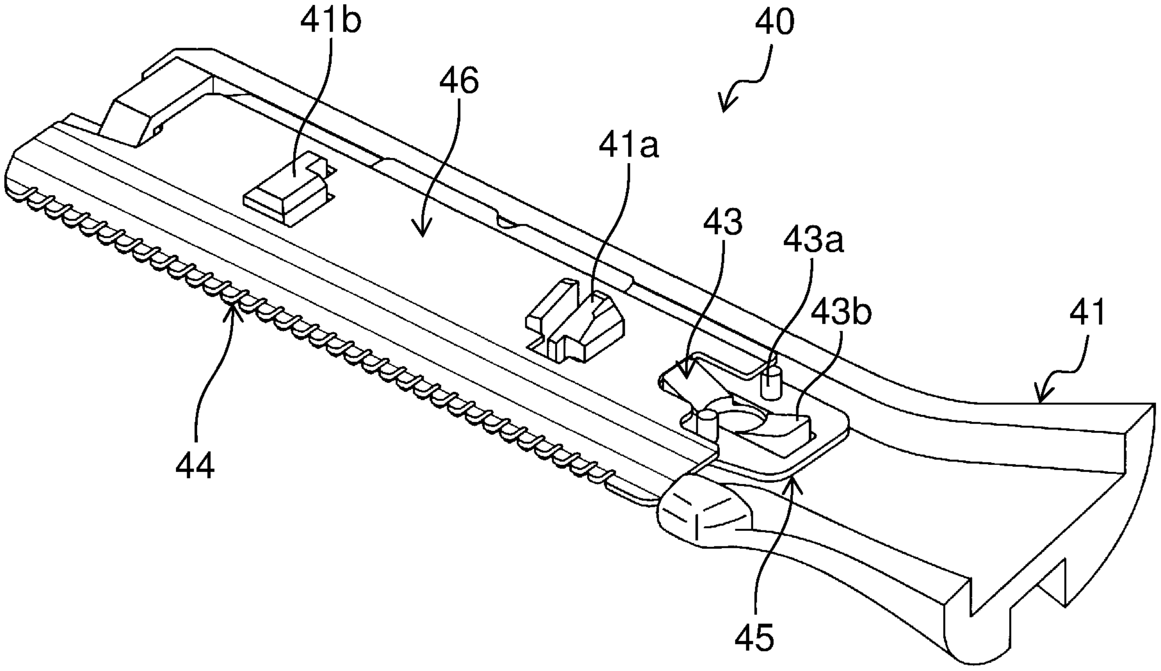
FIG. 3 is a perspective view illustrating a blade unit according to the exemplary embodiment.
Figure 4:
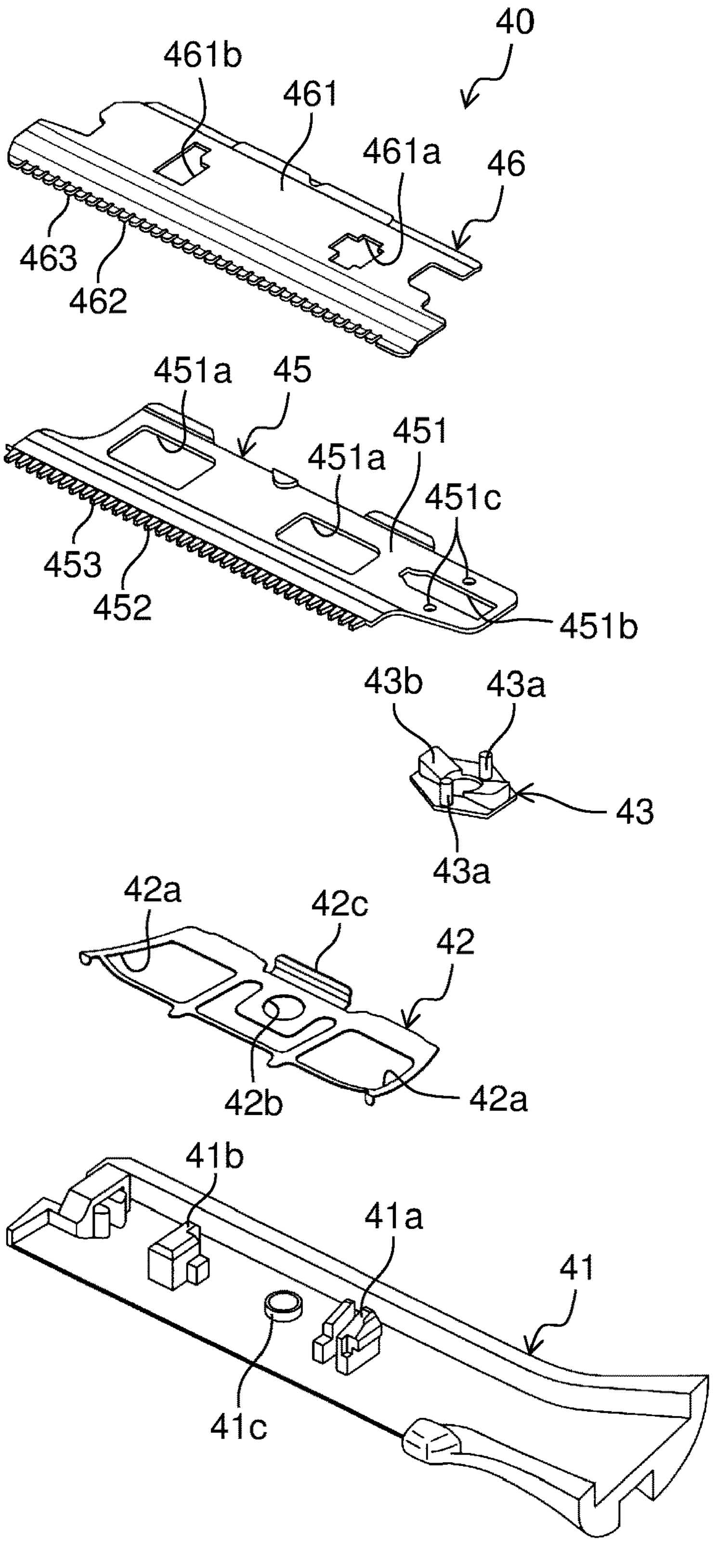
FIG. 4 is a perspective view illustrating the blade unit according to the exemplary embodiment in an exploded manner.

Moreover, as illustrated in FIGS. 3 and 4, blade unit 40 includes base part 41 made of synthetic resin where blade part 44 is disposed. Further, blade unit 40 includes pressing spring 42 fixed to fixed plate 46 and pressing movable plate 45 toward fixed plate 46, and bush 43 fixed to movable plate 45 by heat-sealing.

Base part 41 is a member that forms a part of an outer shell of head part 30, in a state where blade unit 40 is attached to grip part 20 (see FIG. 2). This base part 41 includes: hook part 41*a* that engages with fixed plate 46 to suppress come-off of fixed plate 46 from base part 41; positioning protrusion 41*b* that suppresses misalignment of fixed plate 46; and rib 41*c* that suppresses misalignment of pressing spring 42.

Pressing spring 42 is a member to cause movable blade bar 452 and fixed blade bar 462 to slide more reliably, by pressing movable plate 45 toward fixed plate 46. This pressing spring 42 includes: insertion hole 42*a* into which hook part 41*a* and positioning protrusion 41*b* are inserted; positioning hole 42*b* into which rib 41*c* is inserted; and fixing piece 42*c* to which fixed plate 46 is fixed. In the present exemplary embodiment, insertion hole 42*a* is formed so as to be larger than hook part 41*a* and positioning protrusion 41*b*. Further, positioning hole 42*b* is formed such that an inner diameter thereof is substantially the same as an outer diameter of positioning protrusion 41*b*. Therefore, by inserting positioning protrusion 41*b* into positioning hole 42*b*, pressing spring 42 is positioned with respect to base part 41.

Bush 43 is a drive connecting member attached to movable plate 45. Bush 43 includes a pair of drive poles 43*a* to which arm part 61 of motion converter 60 is connected, and protrusion 43*b* formed between the pair of drive poles 43*a*.

Movable plate 45 includes main body 451. This main body 451 is formed with: insertion hole 451*a* into which hook part 41*a* and positioning protrusion 41*b* are inserted; insertion hole 451*b* into which protrusion 43*b* is inserted; and a pair of insertion holes 451*c* into which the pair of drive poles 43*a* are respectively inserted. Bush 43 is fixed to movable plate 45 by applying heat-sealing processing, in a state where protrusion 43*b* has been inserted into insertion hole 451*b*, and the pair of drive poles 43*a* are respectively inserted into the pair of insertion holes 451*c*.

Note that, in the present exemplary embodiment, insertion hole 451*a* is formed so as to be larger than hook part 41*a* and positioning protrusion 41*b*. Movable plate 45 is made capable of reciprocating with respect to base part 41 in at least blade moving direction W, in a state where hook part 41*a* and positioning protrusion 41*b* have been inserted through insertion hole 451*a*.

Further, on one end side of main body 451, movable plate 45 includes a plurality of movable blade bars 452 provided side by side in blade moving direction W, and a plurality of movable blade grooves 453 formed between adjacent movable blade bars 452.

Fixed plate 46 includes main body 461. This main body 461 is formed with engagement hole 461*a* that engages with hook part 41*a*, and insertion hole 461*b* into which positioning protrusion 41*b* is inserted. Fixed plate 46 is fixed to base part 41 by inserting positioning protrusion 41*b* into insertion hole 461*b* while engaging hook part 41*a* with engagement hole 461*a*. At this time, fixed plate 46 is fixed to base part 41 in a state where a relative motion in blade moving direction W with respect to base part 41 is restricted.

Further, on one end side of main body 461, fixed plate 46 includes a plurality of fixed blade bars 462 provided side by side in blade moving direction W, and a plurality of fixed blade grooves 463 formed between adjacent fixed blade bars 462.

Blade unit 40 having such a configuration can be assembled by, for example, a method which will be described below. Note that the method which will be described below is merely an example, and blade unit 40 can be assembled by various methods.

First, pressing spring 42 is attached to base part 41 in a positioned state by inserting positioning protrusion 41*b* into positioning hole 42*b* while inserting hook part 41*a* and positioning protrusion 41*b* of base part 41 into insertion hole 42*a* of pressing spring 42.

Next, bush 43 is integrated with movable plate 45 by applying heat-sealing processing, in a state where protrusion 43*b* has been inserted into insertion hole 451*b*, and the pair of drive poles 43*a* have been respectively inserted into the pair of insertion holes 451*c*. Note that, it is also possible to assemble blade unit 40 after preparing bush 43 integrated with movable plate 45 in advance.

Next, movable plate 45 is arranged on pressing spring 42 by inserting hook part 41*a* and positioning protrusion 41*b* of base part 41 into insertion hole 451*a* of movable plate 45 to which bush 43 has been integrated.

Next, fixed plate 46 is fixed to base part 41 by inserting positioning protrusion 41*b* into insertion hole 461*b* while engaging hook part 41*a* of base part 41 with engagement hole 461*a* of fixed plate 46. At this time, fixing piece 42*c* of pressing spring 42 is fixed to an end of fixed plate 46 on a root side (a side opposite to a side where fixed blade bar 462 and fixed blade groove 463 are formed).

With this process, blade unit 40 illustrated in FIG. 3 is assembled.

In the present exemplary embodiment, blade unit 40 illustrated in FIG. 3 is detachably attached to grip part 20. Note that, in the present exemplary embodiment, in a state where blade unit 40 is attached to grip part 20, movable blade bar 452 and fixed blade bar 462 project on the front side in front-rear direction X.

Further, blade unit 40 is attached to grip part 20 in a state where drive pole 43*a* of bush 43 is connected to arm part 61. This configuration allows movable plate 45 to reciprocate with respect to fixed plate 46 in blade moving direction W in conjunction with the reciprocating motion of arm part 61 in blade moving direction W when the electric motor is driven.

By covering fixed plate 46 with cover 50 in a state where blade unit 40 is attached to grip part 20, head part 30 having blade part 44 is formed. In this case, distal end sides of movable blade bar 452 and fixed blade bar 462 are exposed from housing 31 constituting an outer shell of head part 30.

Moreover, in the present exemplary embodiment, trimmer 10 is configured such that angle θ1 formed by blade moving direction (reciprocating sliding direction of the movable blade) W and the up-down direction (longitudinal direction of grip part 20) is an acute angle (see FIG. 1). This angle θ1 is determined on the basis of operability when eyebrow (hair) H are cut by using trimmer 10, and is desirably less than or equal to 45°.

This configuration makes it possible to reduce a difference between operation feeling when trimmer 10 is moved in one direction of width direction Y, which is a main operation direction, and operation feeling when the trimmer is moved in another direction of width direction Y. As a result, trimmer 10 can be used in both directions on one side and another side in width direction Y without any discomfort, which can improve usability of the trimmer.

Specifically, as illustrated in FIG. 5, it is made possible to cut eyebrow (hair) H by applying fixed plate (fixed blade) 46 of blade part 44 on skin (skin surface) S, which is an example of a target site.

Further, as illustrated in FIG. 6, it is also made possible to cut eyebrow (hair) H by applying movable plate (movable blade) 45 of blade part 44 on skin (skin surface) S, which is an example of a target site.

Further, in the present exemplary embodiment, housing 11 is provided with sliding operation switch 21 that operates trimmer 10 (turns on and off a power supply). Note that, in the present exemplary embodiment, sliding operation switch 21 is exemplified as a switch, but a pressing switch or other switch may be used as long as the switch can turn on and off the power supply.

In the present exemplary embodiment, operation switch 21 is provided on front surface (front surface: outer surface) 20*a* of grip part 20 so as to be slidable in up-down direction Z. Specifically, the power supply of trimmer 10 can be switched from off to on by sliding of operation switch 21 from the lower side to the upper side in up-down direction Z. Further, the power supply of trimmer 10 can be switched from on to off by sliding of operation switch 21 from the upper side to the lower side in up-down direction Z.

As described above, in the present exemplary embodiment, the power supply of trimmer 10 is switched from off to on by sliding of operation switch 21 toward the upper side. When the power supply of trimmer 10 is switched from off to on, the electric motor is driven, and a rotation of the electric motor is converted into a linear reciprocating motion of arm part 61 by motion converter 60. With the linear reciprocating motion of arm part 61, movable plate 45 reciprocates linearly with respect to fixed plate 46. Movable blade bar 452 reciprocatingly slides with respect to fixed blade bar 462, and eyebrow (hair) H introduced between fixed blade groove 463 and movable blade groove 453 is sandwiched and cut by movable blade bar 452 and fixed blade bar 462.

Note that, in the present exemplary embodiment, movable blade bar 452 reciprocatingly slides in planar contact with fixed blade bar 462. That is, when movable plate 45 reciprocates linearly with respect to fixed plate 46, movable plate 45 and fixed plate 46 are brought into sliding contact with each other at sliding contact surface P1 (see FIGS. 10 and 11).

Further, in the present exemplary embodiment, attachment 100 for adjusting a length (length after cutting) of eyebrow (hair) H to be cut can be detachably attached to trimmer 10.

Example of Configuration of Attachment

Next, an example of a configuration of attachment 100 will be described.

Figure 12:
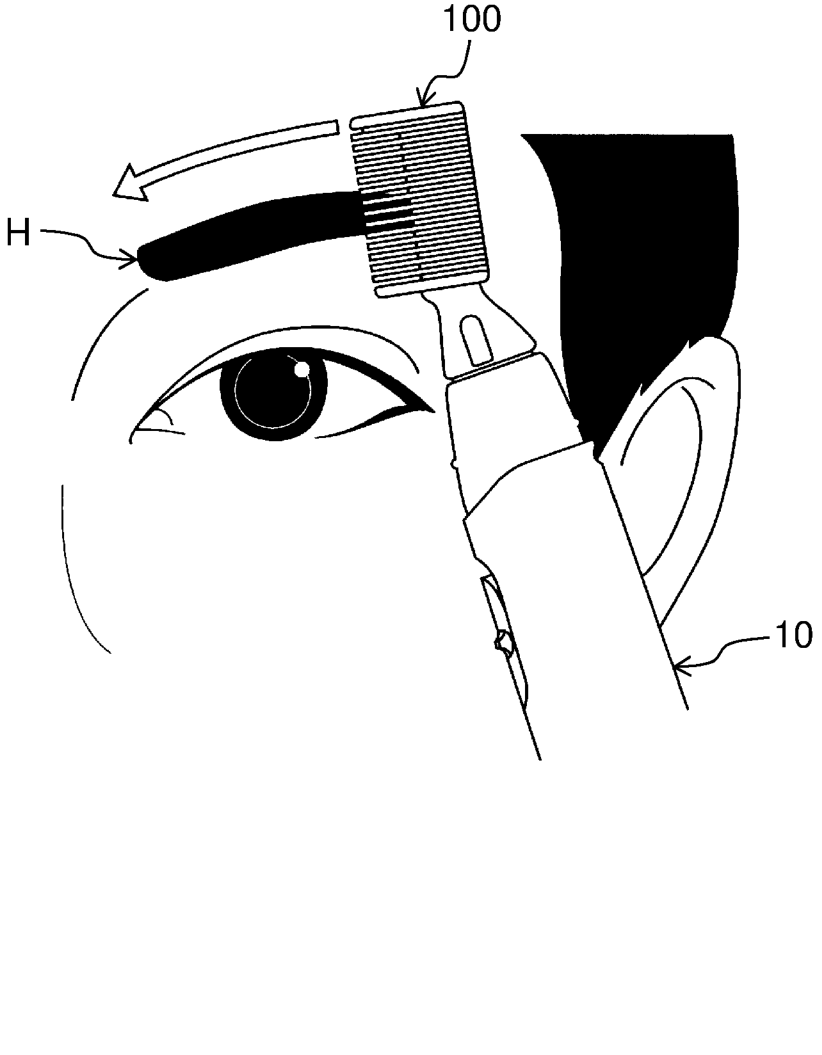
FIG. 12 is a diagram illustrating an example of a method of using the electric hair-cutting device to which the attachment is attached.

Attachment 100 is detachably attached to trimmer 10 to adjust a length (length after cutting) of eyebrow (hair) H introduced between fixed blade bar 462 and movable blade bar 452. Specifically, as illustrated in FIG. 12, attachment 100 attached to trimmer 10 is moved from an outside to an inside of eyebrow (hair) H to adjust a length (length after cutting) of eyebrow (hair) H.

Figure 7:
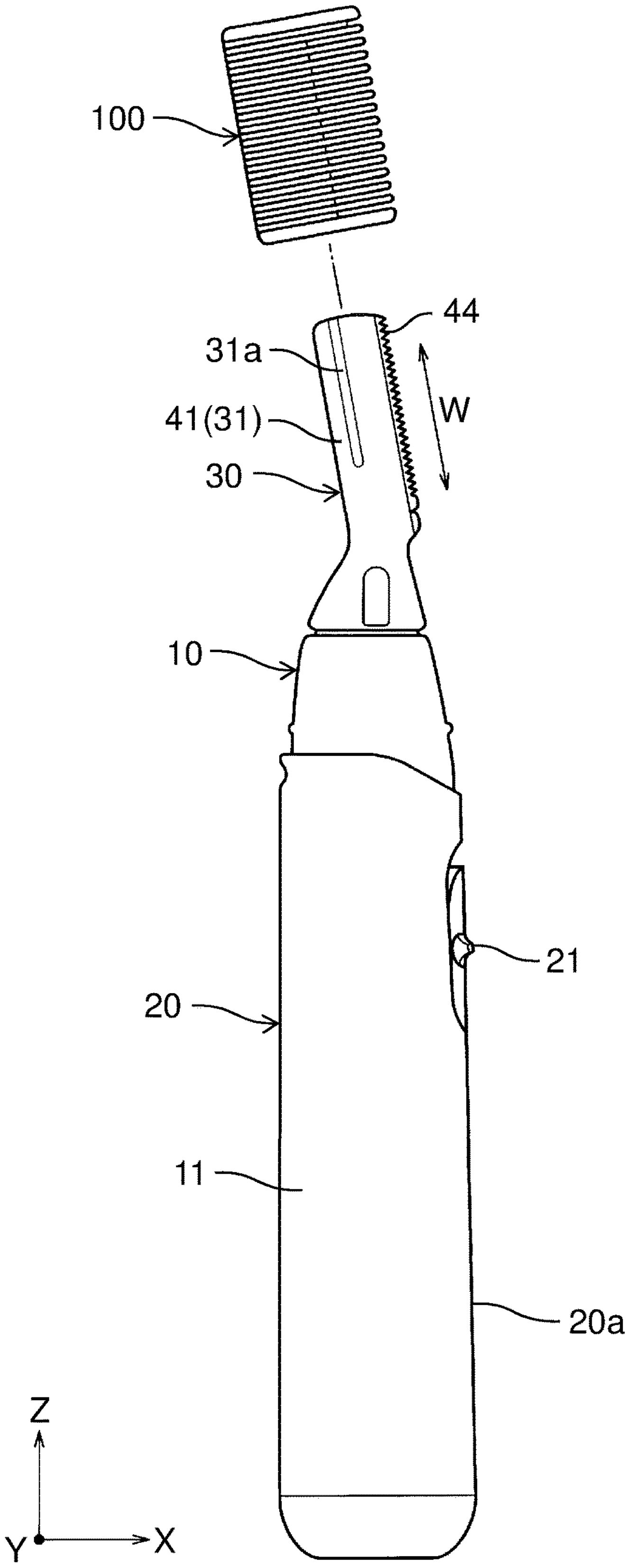
FIG. 7 is a side view illustrating the electric hair-cutting device and an attachment in a state of not being attached to the electric hair-cutting device.
Figure 8:
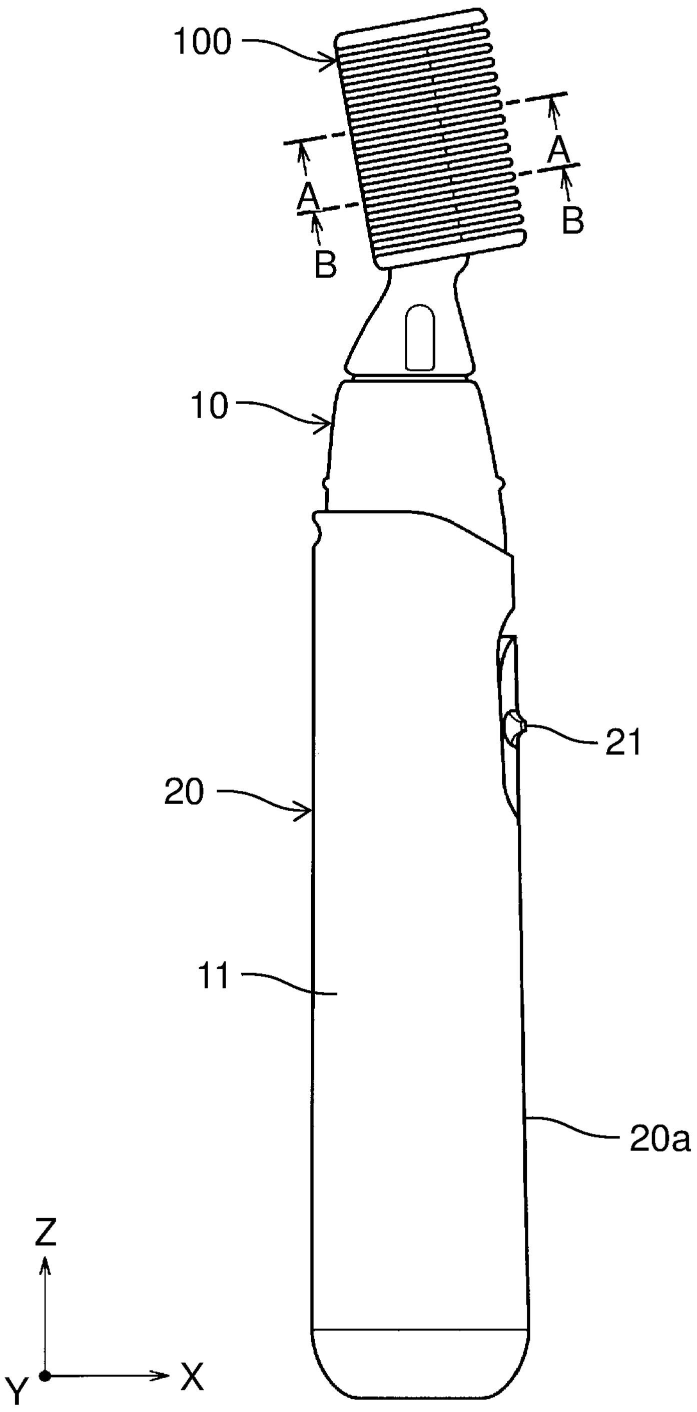
FIG. 8 is a side view illustrating a state in which the attachment is attached to the electric hair-cutting device.

In the present exemplary embodiment, attachment 100 is configured to be attached to trimmer 10 by being relatively moved in blade moving direction W with respect to trimmer 10 (see FIGS. 7 and 8).

Figure 9:
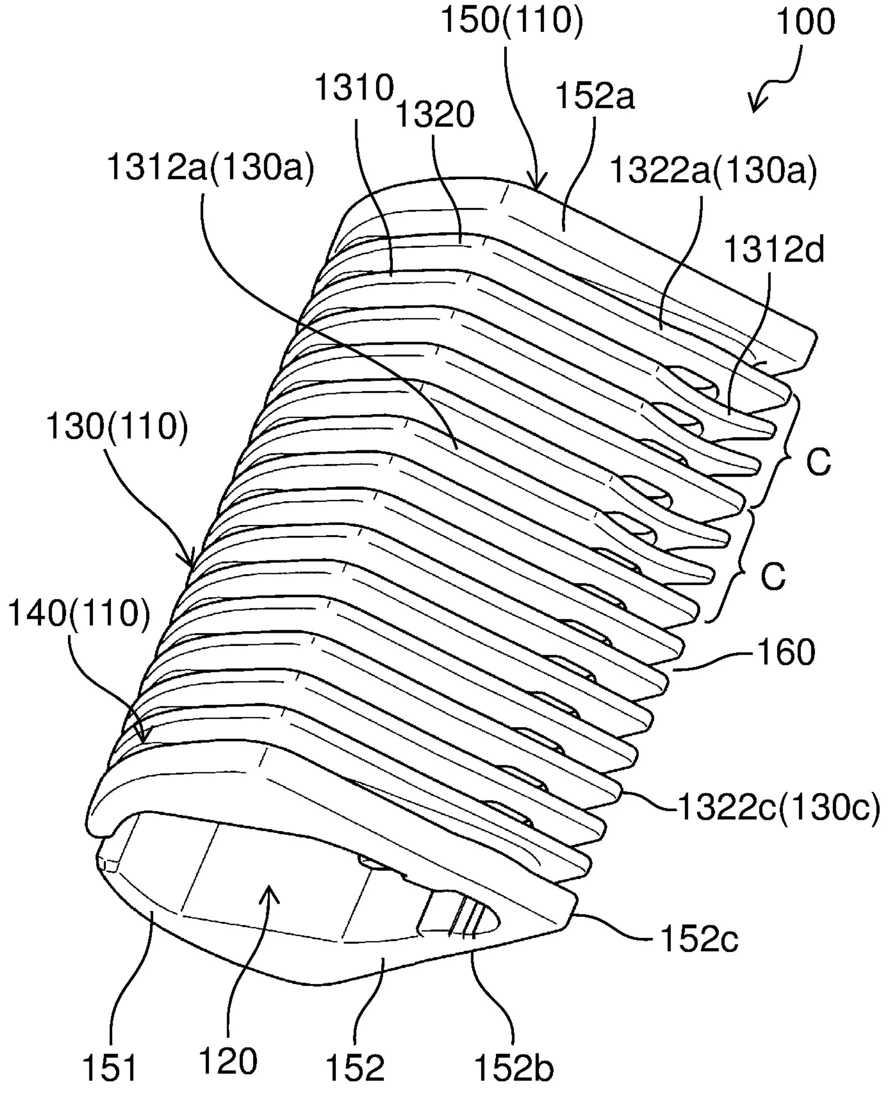
FIG. 9 is a perspective view illustrating the attachment according to the exemplary embodiment.

As illustrated in FIG. 9, attachment 100 includes annular (including substantially annular) comb parts 110 in which insertion hole 120 into which head part 30 having blade part 44 is inserted is formed at the center, and can be formed by using, for example, a synthetic resin material. Comb parts 110 are arranged around blade part 44 in a state where an upper end of head part 30 has been inserted into insertion hole 120 and attachment 100 is attached to trimmer 10.

Note that engagement parts (not illustrated) to engage with each other are formed in attachment 100 and trimmer 10, and attachment 100 attached to trimmer 10 can be more reliably prevented from being detached.

Comb part 110 includes a plurality of combs 130 each arranged in a state of being separated in one direction (blade moving direction W), and connecting part 140 connecting the plurality of combs 130. Moreover, comb parts 110 are arranged at both ends of comb parts 110 in blade moving direction W, and include protection member 150 for increasing (reinforcing) the strength of comb parts 110 (attachment 100). Protection member 150 is connected to combs 130 arranged on both sides by connecting part 140, and defines a cutting range (range in blade moving direction W) of eyebrow (hair) H when attachment 100 is used.

As described above, in the present exemplary embodiment, the plurality of combs 130 are provided side by side in a state of being separated along blade moving direction W. Thus, introduction hole 160 through which eyebrow (bristle) H guided by combs 130 can be introduced inward (between fixed blade bar 462 and movable blade bar 452) is formed between combs 130 adjacent to each other in blade moving direction W.

In the present exemplary embodiment, in a state where attachment 100 is attached to trimmer 10, introduction hole 160 is formed in attachment 100 from both sides (from fixed blade bar 462 and movable blade bar 452) of blade part 44 to a distal end.

In each of the plurality of combs 130, one skin contact surface 130*a* that comes into contact with skin (skin surface) S in a state where fixed blade bar 462 is positioned downward, and other skin contact surface 130*b* that comes into contact with skin (skin surface) S in a state where movable blade bar 452 is positioned downward are formed.

Further, in protection member 150, one skin contact surface 152*a* that comes into contact with skin (skin surface) S in a state where fixed blade bar 462 is positioned downward, and other skin contact surface 152*b* that comes into contact with skin (skin surface) S in a state where movable blade bar 452 is positioned downward are formed.

As described above, attachment 100 of the present exemplary embodiment is configured to be able to select between a first use mode in which the attachment is used with one side (fixed blade bar 462) of blade part 44 coming into contact with skin S and a second use mode in which the attachment is used with the other side (movable blade bar 452) of blade part 44 coming into contact with skin S.

That is, in a state where attachment 100 is attached to trimmer 10, the skin contact surfaces are provided on both sides in width direction Y of the plurality of combs 130 and protection member 150, and thus, the length (length after cutting) of eyebrow H can be adjusted on both sides of blade part 44.

In this manner, operability of trimmer 10 to which attachment 100 is attached can be further improved, and shaving efficiency can be further improved.

Here, the length (length after cutting) of eyebrow H after the use of trimmer 10 to which attachment 100 is attached is determined by a distance from skin contact surface (flat surface) 130*a* or 130*b* to a cut point (sliding contact surface P1 of movable blade bar 452 and fixed blade bar 462).

In the present exemplary embodiment, paired engagement protrusions 1311*a* are formed so as to face each other on an inner surface side of comb 130. Engagement protrusions 1311*a* are respectively inserted into a pair of engagement grooves 31*a* formed in housing 31 of head part 30 when attachment 100 is attached to trimmer 10. Engagement protrusions 1311*a* engage with engagement grooves 31*a*, and thus, the relative movement of attachment 100 with respect to head part 30 is suppressed. Thus, a distance from skin contact surface (flat surface) 130*a* or 130*b* to the cut point becomes a predetermined distance.

Note that when the distance from skin contact surface (flat surface) 130*a* or 130*b* to the cut point is changed, the length (length after cutting) of eyebrow H also changes.

That is, when the distance from skin contact surface (flat surface) 130*a* or 130*b* to the cut point is changed, the length of eyebrow H (length after cutting) can be set to a desired length.

In the present exemplary embodiment, the length of eyebrow H (length after cutting) can be changed stepwise.

Figure 10:
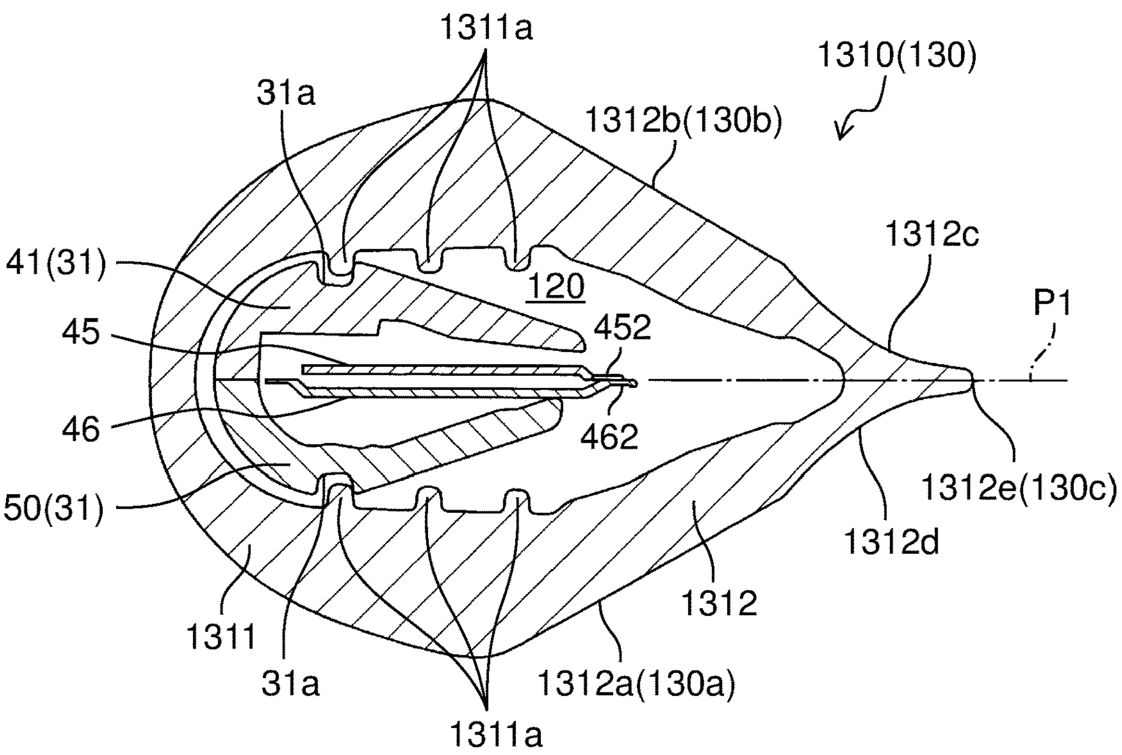
FIG. 10 is a cross-sectional view taken along line A-A in FIG. 8.

Specifically, paired engagement protrusions 1311*a* are formed so as to face each other at three locations on the inner surface side of comb 130, and paired engagement protrusions 1311*a* can engage with the pair of engagement grooves 31*a*, respectively (see FIG. 10).

Paired engagement protrusions 1311*a* to engage with the pair of engagement grooves 31*a* are appropriately selected, and thus, the length (length after cutting) of eyebrow H can be selected from three types.

Meanwhile, in order to cut lying hair to align the length of the lying hair equal to a desired length after cutting, it is necessary to cut the lying hair while raising the hair when the lying hair is cut with blade part 44.

Thus, in the present exemplary embodiment, combs 130 and protection member 150 are formed such that top parts 130*c* and 152*c* are tapered, and the lying hair during cutting can be raised more reliably.

Specifically, comb parts 110 are formed such that an angle formed between one skin contact surface 130*a* or 152*a* and other skin contact surface 130*b* or 152*b* is an acute angle. This angle is preferably less than or equal to, for example, 70°. Thus, the skin contact surfaces of combs 130 and protection member 150 function as a hair raising part for raising the lying hair.

Figure 11:
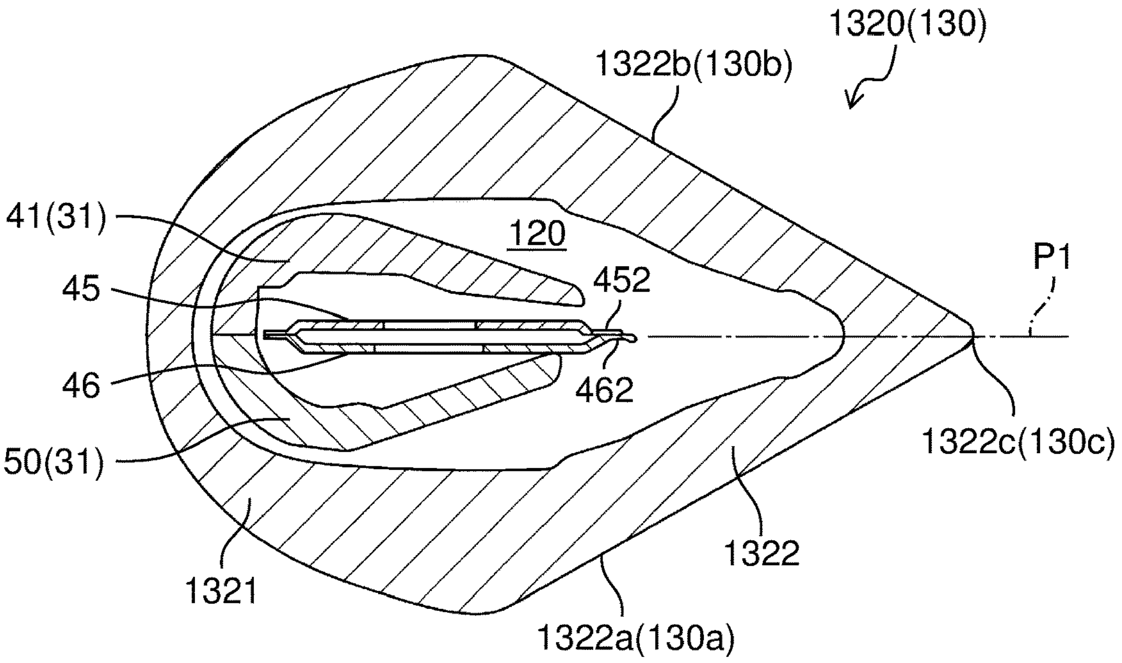
FIG. 11 is a cross-sectional view taken along line B-B of FIG. 8.

Note that, in the present exemplary embodiment, combs 130 and protection member 150 are formed such that top parts 130*c* and 152*c* are positioned on an extension of sliding contact surface P1 in a state where attachment 100 is attached to trimmer 10 (see FIGS. 10 and 11). Thus, even when any one of the first use mode or the second use mode is selected, substantially the same hair raising performance can be obtained.

However, as in the present exemplary embodiment, when eyebrow H having a relatively large number of laying hairs is cut to be aligned to a desired length, eyebrow H cannot be raised sufficiently, and it may be difficult to align the length after cutting to a target length.

As described above, when the length after cutting cannot be aligned to the target length, the same hair needs to be cut many times to be aligned to the target length, and time and effort are taken.

Thus, in the present exemplary embodiment, even when hair having a relatively large number of laying hairs such as eyebrow H is cut, the hair can be raised more reliably and can be cut to a target length more quickly.

Specifically, comb 130 includes hair raising comb (first comb) 1310 having a relatively high hair raising performance.

In the present exemplary embodiment, hair raising comb (first comb) 1310 includes main body 1311 which is disposed so as to face housing 31 of head part 30 in a state where attachment 100 is attached to trimmer 10. Further, hair raising comb (first comb) 1310 includes hair straightening part 1312 continuously provided on main body 1311 to straighten eyebrow H during use.

Hair straightening part 1312 is formed such that a distal end side is tapered, and flat surfaces inclined toward the distal end side and an inner side as viewed along blade moving direction W are formed on both sides (both sides in width direction Y) of blade part 44 each facing main body 1311 of hair straightening part 1312.

In the present exemplary embodiment, the flat surfaces inclined toward the distal end side and the inner side are skin contact surfaces that come into contact with skin S during use. Specifically, in a state where attachment 100 is attached to trimmer 10, a flat surface positioned on one side (side facing fixed blade bar 462) in width direction Y is one skin contact surface 1312*a* that comes into contact with skin S when the first use mode is selected (see FIG. 13). In a state where attachment 100 is attached to trimmer 10, a flat surface positioned on the other side (side facing movable blade bar 452) in width direction Y is other skin contact surface 1312*b* that comes into contact with skin S when the second use mode is selected (see FIG. 14).

Moreover, in the present exemplary embodiment, the hair raising property of eyebrow H having many lying hairs can be further enhanced by further thinning a distal end of tapered hair raising comb (first comb) 1310.

Specifically, hair straightening part 1312 includes hair raising groove 1312*d* formed so as to be continuously provided on a distal end of one skin contact surface 1312*a* and hair raising groove 1312*c* formed so as to be continuously provided on a distal end of other skin contact surface 1312*b*.

In the present exemplary embodiment, hair raising groove 1312*d* protruding inward is formed on the distal side of one skin contact surface 1312*a* so as to be continuously provided on the distal end of one skin contact surface 1312*a*. Further, on the distal end side of other skin contact surface 1312*b*, hair raising groove 1312*c* protruding inward is also formed so as to be continuously provided on the distal end of other skin contact surface 1312*b*.

A distal end of hair raising groove 1312*d* and a distal end of hair raising groove 1312*c* are connected by top part 1312*e*.

As described above, in the present exemplary embodiment, the distal end of hair straightening part 1312 has a shape like being gouged out, and the lying hair (eyebrow H) is raised by scooping up the lying hair (eyebrow H) at the gouged portion on the distal end side.

Figure 13:
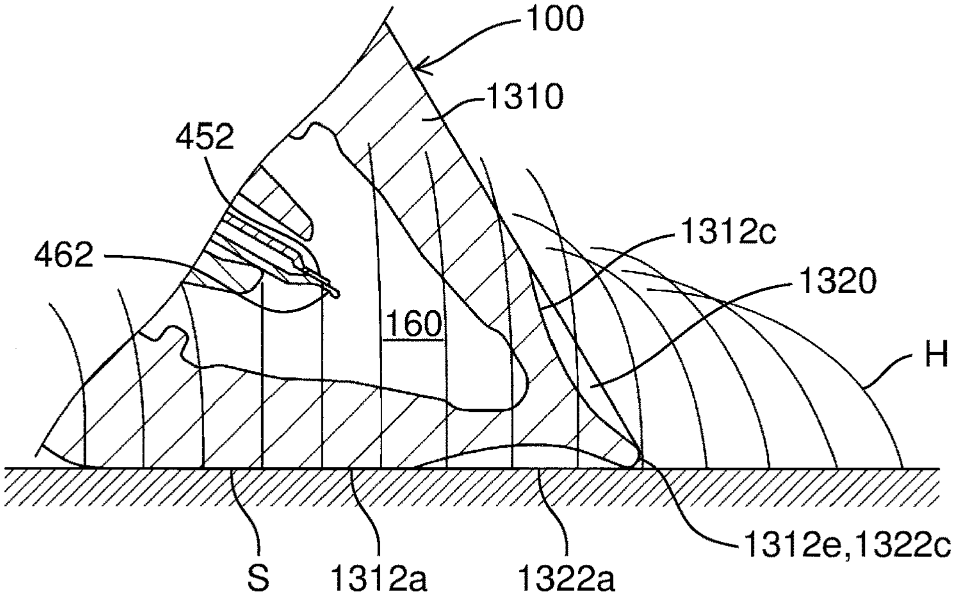
FIG. 13 is a diagram for describing a scene where hair is cut when the electric hair-cutting device to which the attachment is attached is used in a first use mode.

Specifically, when the first use mode is selected and one skin contact surface 1312*a* is brought into contact with skin S, hair raising groove 1312*c* formed so as to be continuously provided on the distal end of other skin contact surface 1312*b* functions as the hair raising part for raising the lying hair (see FIG. 13).

Figure 14:
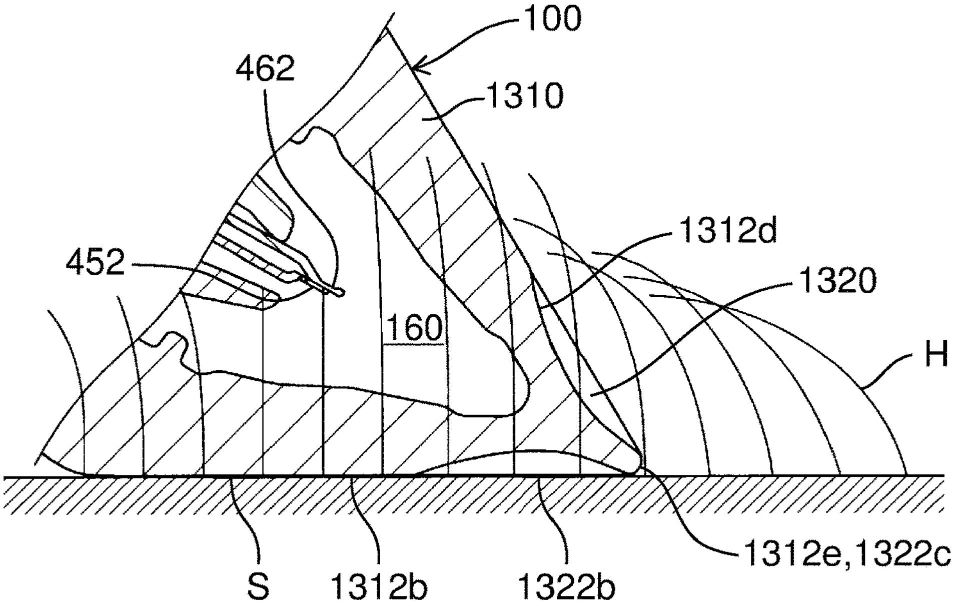
FIG. 14 is a diagram for describing a scene where hair is cut when the electric hair-cutting device to which the attachment is attached is used in a second use mode.

On the other hand, when the second use mode is selected and other skin contact surface 1312*b* is brought into contact with skin S, hair raising groove 1312*d* formed so as to be continuously provided on the distal end of one skin contact surface 1312*a* functions as the hair raising part for raising the lying hair (see FIG. 14).

As described above, both surfaces on both sides in width direction Y defining hair raising comb (first comb) 1310 are configured to have a function of the hair raising part or a function of the skin contact surface.

Thus, the hair raising performance on both sides of blade part 44 can be further improved.

However, if all of the plurality of combs 130 are hair raising combs (first combs) 1310, since hair raising grooves 1312*c* and 1312*d* are formed on both sides of blade part 44, skin S may excessively bite into hair raising grooves 1312*c* and 1312*d* when attachment 100 is used. As described above, when skin S excessively bites into hair raising grooves 1312*c* and 1312*d* as described above, a distance from skin S to the cut point changes depending on the location, and the length of eyebrow H (length after cutting) may become uneven.

In the present exemplary embodiment, comb 130 also includes skin contact comb (second comb) 1320 having lower hair raising performance than hair raising comb (first comb) 1310 and mainly functioning as skin contact, and the excessive biting of skin S into hair raising grooves 1312*c* and 1312*d* can be suppressed.

That is, the plurality of combs 130 are obtained by mixing hair raising comb (first comb) 1310 having two functions of hair raising and skin contact and skin contact comb (second comb) 1320 having a function of the skin contact surface for aligning a cutting height to a target height.

In the present exemplary embodiment, skin contact comb (second comb) 1320 includes main body 1321 which is disposed so as to face housing 31 of head part 30 in a state where attachment 100 is attached to trimmer 10. Further, skin contact comb (second comb) 1320 includes hair straightening part 1322 which is continuously provided on main body 1321 and straightens eyebrow H during use.

Hair straightening part 1322 is formed such that a distal end side thereof is tapered, and flat surfaces inclined toward the distal end side and an inner side as viewed along blade moving direction W are formed on both sides (both sides in width direction Y) of blade part 44 each facing main body 1321 of hair straightening part 1322.

In the present exemplary embodiment, the flat surfaces inclined toward the distal end side and the inner side are skin contact surfaces that come into contact with skin S during use. Specifically, in a state where attachment 100 is attached to trimmer 10, a flat surface positioned on one side (side facing fixed blade bar 462) in width direction Y is one skin contact surface 1322*a* that comes into contact with skin S when the first use mode is selected (see FIG. 13). Further, in the state where attachment 100 is attached to trimmer 10, the flat surface positioned on the other side (side facing movable blade bar 452) in width direction Y is other skin contact surface 1322*b* that comes into contact with skin S when the second use mode is selected (see FIG. 14).

Note that when the first use mode is selected, other skin contact surface 1322*b* raises eyebrow H with a lower hair raising performance than hair raising comb (first comb) 1310. Further, when the second use mode is selected, one skin contact surface 1322*a* raises eyebrow H with a lower hair raising performance than hair raising comb (first comb) 1310.

A distal end of one skin contact surface 1322*a* and a distal end of other skin contact surface 1322*b* are connected by top part 1322*c*.

As described above, in the present exemplary embodiment, the hair raising groove is not formed in hair straightening part 1322 of skin contact comb (second comb) 1320. Accordingly, a contour shape of skin contact comb (second comb) 1320 as viewed along blade moving direction W is different from a contour shape of hair raising comb (first comb) 1310.

Further, in the present exemplary embodiment, a contour shape (the contour shape as viewed in blade moving direction W) of protection member 150 is identical to (including substantially identical to) the contour shape of skin contact comb (second comb) 1320.

That is, protection member 150 includes main body 151 disposed so as to face housing 31 of head part 30 in a state where attachment 100 is attached to trimmer 10. Further, protection member 150 includes hair straightening part 152 that is continuously provided on main body 151 and straightens eyebrow H during use.

Hair straightening part 152 is formed such that a distal end side is tapered, and flat surfaces inclined toward the distal end side and an inner side as viewed along blade moving direction W are formed on both sides (both sides in width direction Y) of blade part 44 each facing main body 151 of hair straightening part 152.

In the present exemplary embodiment, the flat surfaces inclined toward the distal end side and the inner side are skin contact surfaces that come into contact with skin S during use and define the cutting range. Specifically, in a state where attachment 100 is attached to trimmer 10, a flat surface positioned on one side (side facing fixed blade bar 462) in width direction Y is one skin contact surface 152*a* that comes into contact with skin S when the first use mode is selected. In a state where attachment 100 is attached to trimmer 10, the flat surface positioned on the other side (side facing movable blade bar 452) in width direction Y is other skin contact surface 152*b* that comes into contact with skin S when the second use mode is selected.

A distal end of one skin contact surface 152*a* and a distal end of other skin contact surface 152*b* are connected by top part 152*c*.

As described above, protection member 150 is a member for increasing (reinforcing) the strength of comb part 110 (attachment 100). Thus, in the present exemplary embodiment, protection member 150 is formed such that a thickness (width in blade moving direction W) is larger than a thickness (width in blade moving direction W) of skin contact comb (second comb) 1320.

Note that, in the present exemplary embodiment, a thickness (width in blade moving direction W) of hair raising comb (first comb) 1310 and a thickness (width in blade moving direction W) of skin contact comb (second comb) 1320 are substantially identical. Thus, a thickness (width in blade moving direction W) of protection member 150 is larger than a thickness (width in blade moving direction W) of hair raising comb (first comb) 1310.

Such protection members 150 are arranged at both ends of comb part 110 in blade moving direction W, and thus, the cutting range (range in blade moving direction W) of eyebrow (hair) H when attachment 100 is used is defined by the pair of protection members 150.

Moreover, in the present exemplary embodiment, one skin contact surface 1312*a* of hair raising comb (first comb) 1310, one skin contact surface 1322*a* of skin contact comb (second comb) 1320, and one skin contact surface 152*a* of protection member 150 are flush with one another (including substantially flush with one another).

Similarly, other skin contact surface 1312*b* of hair raising comb (first comb) 1310, other skin contact surface 1322*b* of skin contact comb (second comb) 1320, and other skin contact surface 152*b* of protection member 150 are flush with one another (including substantially flush with one another).

Accordingly, when the first use mode is selected, one skin contact surfaces 1321*a*, 1322*a*, and 152*a* come into contact with skin S, and when the second use mode is selected, other skin contact surfaces 1321*b*, 1322*b*, and 152*b* come into contact with skin S.

At this time, in order to improve the hair raising performance of hair raising comb (first comb) 1310, it is necessary to apply two locations (two skin contact surfaces) of comb part 110 to skin S. That is, hair raising comb (first comb) 1310 needs to be present between the two skin contact surfaces.

Thus, in the present exemplary embodiment, two types of combs are provided side by side such that there are one or more combinations C in which one or more hair raising combs (first combs) 1310 are arranged between two skin contact combs (second combs) 1320 (see FIG. 9).

That is, at least one hair raising comb (first comb) 1310 and a plurality of skin contact combs (second combs) 1320 are provided side by side such that there are one or more combinations C in which one or more hair raising combs 1310 are arranged between two skin contact combs 1320.

In the present exemplary embodiment, there are two combinations C in which one or more hair raising combs (first combs) 1310 are arranged between two skin contact combs (second combs) 1320.

Specifically, as illustrated in FIG. 9, skin contact comb (second comb) 1320 is disposed at an upper end in blade moving direction W (position adjacent to protection member 150). Two hair raising combs (first combs) 1310 are continuously installed side by side on a lower side of skin contact comb (second comb) 1320 arranged at the upper end, and one skin contact comb (second comb) 1320 is further arranged on the lower side thereof. Two such combinations C are continuously installed side by side.

At this time, skin contact comb (second comb) 1320 in which hair raising combs (first combs) 1310 are arranged on both upper and lower sides serves as combination C on one side and combination C on the other side in blade moving direction W.

When hair raising comb (first comb) 1310 and skin contact comb (second comb) 1320 are arranged as described above, skin contact combs (second combs) 1320 can be prevented from being adjacent to each other in blade moving direction W in two combinations C installed side by side. That is, skin contact combs (second combs) 1320 can be prevented from being partially adjacent to each other in blade moving direction W.

In this manner, in a state where two locations (two skin contact combs 1320) have been brought into contact with skin S, since the laying hair is raised by hair raising comb (first comb) 1310 present between two locations, hair raising efficiency by hair raising comb (first comb) 1310 can be further improved.

Further, a distance between two skin contact combs (second combs) 1320 which are adjacent to each other and have hair raising combs (first combs) 1310 interposed therebetween is preferably set to such a distance that the eyebrow does not bite while exhibiting a hair raising effect.

Specifically, a distance between two skin contact combs (second combs) 1310 which are adjacent to each other and have hair raising comb (first comb) 1320 interposed therebetween is preferably less than or equal to 5.0 mm. This is because when a distance between two skin contact combs 1320 which are adjacent to each other and have hair raising comb 1310 interposed therebetween is larger than 5.0 mm, the eyebrow (skin S) bites into a space between two skin contact combs 1320 or into the hair raising groove of hair raising comb 1310.

In the present exemplary embodiment, a distance between two skin contact combs (second combs) 1320 which are adjacent to each other and have hair raising combs (first combs) 1310 interposed therebetween is about 1.7 mm.

Note that, in the present exemplary embodiment, since trimmer 10 for cutting eyebrow H is used as an example, the distance between two skin contact combs (second combs)

1320 which are adjacent to each other and have hair raising comb (first comb) 1310 interposed therebetween is set to a distance that prevents the eyebrow from biting. However, this distance can be appropriately set according to the application of the electric hair-cutting device.

[Operational Effect]

Hereinafter, a characteristic configuration of the attachment for the electric hair-cutting device shown in the exemplary embodiment described above and effects obtained by the attachment for the electric hair-cutting device will be described.

(1) An attachment for an electric hair-cutting device described in the above exemplary embodiment is detachably attached to an electric hair-cutting device having a blade part. The attachment for the electric hair-cutting device is configured to be selectable between a first use mode in which the attachment is used with a first side of the blade part coming into contact with a skin and a second use mode in which the attachment is used with a second side facing the first side of the blade part coming into contact with a skin. The attachment for the electric hair-cutting device described in the above exemplary embodiment includes a comb part that is disposed around the blade part in a state of being attached to the electric hair-cutting device. The comb part includes at least one first comb that has a first skin contact surface coming into contact with the skin when the first use mode is selected, a second skin contact surface coming into contact with the skin when the second use mode is selected, a first hair raising groove formed on the first skin contact surface, and a second hair raising groove formed on the second skin contact surface.

As described above, hair can be more safely cut by attaching the attachment to surround the blade part of the electric hair-cutting device.

Since the comb part includes the first comb in which the hair raising grooves are formed on both sides, even when any one of the first use mode or the second use mode is selected, the lying hair can be raised more reliably.

As a result, it is not necessary to cut the same hair many times until a desired length is obtained, and the hair can be cut to a desired length more quickly. Further, since a cutting length of the hair can be more uniform, the completion of the hair after cutting can be further improved.

(2) Further, in the attachment for the electric hair-cutting device according to (1), the comb part may further include at least one second comb that has a third skin contact surface coming into contact with the skin when the first use mode is selected and a fourth skin contact surface coming into contact with the skin when the second use mode is selected. Hair may be raised with the fourth skin contact surface when the first use mode is selected and hair may be raised with the third skin contact surface when the second use mode is selected.

In this manner, since the comb (first comb) having enhanced hair raising performance and the combs (second combs) mainly used for skin contact are mixed with each other, it is possible to prevent the skin from excessively biting into the hair raising grooves while preventing a decrease in the hair raising effect. As a result, the lying hair can be raised more reliably, and the cutting length of the hair can be more uniform.

(3) Further, in the attachment for the electric hair-cutting device according to (2), the at least one selected comb comprises two second combs, and the at least one first comb and the two second combs may be provided side by side, and there are one or more combinations in which the at least one first comb may be arranged between the two second combs.

In this manner, it is possible to more reliably prevent the skin from excessively biting into the hair raising groove.

(4) Further, in the attachment for the electric hair-cutting device according to (3), the one or more combinations comprises a plurality of combinations, and there may be a portion in which the plurality of the combinations in which one or more first combs are arranged between two second combs are continuously installed side by side in the comb part. In the combinations continuously installed side by side, the two combs may be provided side by side not to be adjacent to each other.

In this manner, in the combinations continuously installed side by side, since the combs (second combs) mainly used for skin contact are not continuously arranged, a decrease in the hair raising performance can be more reliably suppressed.

(5) Further, in the attachment for the electric hair-cutting device according to any one of (2) to (4), protection members that have skin contact surfaces for defining a cutting range of hair during use and reinforce the comb part may be formed at both ends of the comb part. Each of the protection members may have a contour shape identical to a contour shape of the at least one second comb, and has a thickness greater than a thickness of the at least one second comb.

In this manner, the strength of the comb part can be improved by the protection members having the skin contact surfaces for defining the cutting range of the hair during use, and it is possible to more reliably prevent the attachment from being damaged by an external impact, a falling impact, or the like.

[Others]

The contents of the attachment for the electric hair-cutting device according to the present disclosure have been described above, but it is obvious to those skilled in the art that various modifications and improvements are possible without limitation to the descriptions.

For example, it is also possible to provide a comb part in which a combination in which one or more first combs are arranged between two second combs are present only in a part.

Further, the specifications (shape, size, layout, or the like) of the connecting parts, the protection members, and the other details can be changed as appropriate.

As described above, since the attachment for the electric hair-cutting device according to the present disclosure can more reliably raise the lying hair, the attachment can be used for attachments of various electric hair-cutting devices for home use and business use.

REFERENCE MARKS IN THE DRAWINGS

10 trimmer (electric hair-cutting device)
44 blade part
100 attachment
110 comb part
1310 first comb
**1312*a*** one skin contact surface
**1312*b*** other skin contact surface
**1312*c*** hair raising groove
**1312*d*** hair raising groove
1320 second comb
**1322*a*** one skin contact surface
**1322*b*** other skin contact surface
150 protection member
C set of first comb and second comb
H eyebrow (hair)
S skin

The invention claimed is:

1. An attachment configured to be detachably attached to an electric hair-cutting device comprising a blade part, wherein:

the attachment comprises a comb part, and the comb part is configured to be disposed around the blade part when the attachment is attached to the electric hair-cutting device, the comb part comprises at least one first comb and at least one second comb, the at least one first comb has a first skin contact surface and a first hair raising groove, the first skin contact surface includes a first flat surface, the first flat surface of the first skin contact surface extends along the first skin contact surface to the first hair raising groove, the at least one first comb has a second skin contact surface and a second hair raising groove, the second skin contact surface includes a second flat surface, the second flat surface of the second skin contact surface extends along the second skin contact surface to the second hair raising groove, the first skin contact surface and the second skin contact surface are inclined toward a distal end of the at least one first comb in such a manner that the at least one first comb is tapered toward the distal end, the first hair raising groove protrudes inward at the distal end of the at least one first comb and a second concave the second hair raising groove protrudes inward at the distal end of the at least one first comb, the at least one second comb has a third skin contact surface, wherein the third skin contact surface consists of a third flat surface, and the third flat surface extends to a distal end of the at least one second comb, the at least one second comb has a fourth skin contact surface, wherein the fourth skin contact surface consists of a fourth flat surface, and the fourth flat surface extends to the distal end of the at least one second comb, the third skin contact surface and the fourth skin contact surface are inclined toward the distal end of the at least one second comb in such a manner that the at least one second comb is tapered toward the distal end of the at least one second comb, the at least one first comb includes a first imaginary continuation plane of the first flat surface, wherein the first imaginary continuation plane extends from a proximal end of the first hair raising groove to a distal end of the first hair raising groove, when viewed from a side view of the at least one first comb, the first flat surface extends coplanerly to the first imaginary continuation plane, and the first hair raising groove is disposed under the first imaginary continuation plane, the at least one first comb includes a second imaginary continuation plane of the second flat surface, wherein the second imaginary continuation plane extends from a proximal end of the second hair raising groove to a distal end of the second hair raising groove, when viewed from the side view of the at least one first comb, the second flat surface extends coplanerly to the second imaginary continuation plane, and the second hair raising groove is disposed under the second imaginary continuation plane, and when viewed from the side view of the at least one first comb, the third flat surface extends coplanerly to the first imaginary continuation plane between the proximal end of the first hair raising groove and the distal end of the first hair raising groove, and the fourth flat surface extends coplanerly to the second imaginary continuation plane between the proximal end of the second hair raising groove and the distal end of the second hair raising groove.

2. The attachment according to claim 1, wherein the first hair raising groove and the second hair raising grooves are merged at the distal end of the at least one first comb.

3. The attachment according to claim 1, wherein the at least one second comb comprises two second combs, and the at least one first comb is sandwiched between the two second combs.

4. The attachment according to claim 1, wherein the at least one first comb includes two first combs, only one of the at least one second comb is sandwiched between the two first combs, and all of the at least one second comb other than the only one of the at least one second comb is disposed outside of the two first combs.

5. The attachment according to claim 1, further comprises two protection members, wherein:

the two protection members have skin contact surfaces for defining a cutting range of hair during use, and the two protection members are formed at two ends of the comb part, and each of the two protection members has a contour shape identical to a contour shape of the at least one second comb, and each of the protection members has a thickness greater than a thickness of the at least one second comb.

6. The attachment according to claim 1, further comprising three pairs of engagement protrusions formed at three locations on an inner surface side of the comb part, wherein the three pairs of engagement protrusions face each other, during use, one pair of the three pairs of engagement protrusions is inserted into a pair of engagement grooves formed in a housing of the blade part of the electric hair-cutting device, and a length of the hair after cutting is determined by selecting which pair of the engagement protrusions being inserted into the pair of the engagement grooves.

7. The attachment according to claim 1, wherein an angle formed between the first skin contact surface and the second skin contact surface is an acute angle.

8. The attachment according to claim 7, wherein the acute angle is less than 70°.

* * * * *